(12) United States Patent
Mirichigni et al.

(10) Patent No.: US 10,733,046 B2
(45) Date of Patent: Aug. 4, 2020

(54) TRANSACTION METADATA

(71) Applicant: Micron Technology, Inc., Boise, ID (US)

(72) Inventors: Graziano Mirichigni, Vimercate (IT); Marco Sforzin, Cernusco sul Naviglio (IT); Paolo Amato, Treviglio (IT); Danilo Caraccio, Milan (IT)

(73) Assignee: Micron Technology, Inc., Boise, ID (US)

(*) Notice: Subject to any disclaimer, the term of this patent is extended or adjusted under 35 U.S.C. 154(b) by 44 days.

(21) Appl. No.: 15/958,401

(22) Filed: Apr. 20, 2018

(65) Prior Publication Data

US 2019/0324843 A1   Oct. 24, 2019

(51) Int. Cl.
| | |
|---|---|
| *H03M 13/00* | (2006.01) |
| *G06F 11/10* | (2006.01) |
| *G06F 9/46* | (2006.01) |
| *G06F 13/16* | (2006.01) |

(52) U.S. Cl.
CPC ........... *G06F 11/102* (2013.01); *G06F 9/467* (2013.01); *G06F 11/1044* (2013.01); *G06F 13/1689* (2013.01)

(58) Field of Classification Search
CPC .... G06F 11/102; G06F 11/1044; G06F 9/467; G06F 13/1689
See application file for complete search history.

(56) References Cited

U.S. PATENT DOCUMENTS

| | | | |
|---|---|---|---|
| 9,558,066 B2 * | 1/2017 | Bonen .................. | G06F 11/1004 |
| 2011/0041005 A1 | 2/2011 | Selinger | |
| 2013/0246889 A1 | 9/2013 | Kumar et al. | |
| 2014/0075265 A1 * | 3/2014 | Hung .................. | G06F 11/1048 |
| | | | 714/763 |
| 2015/0310916 A1 | 10/2015 | Leem | |
| 2016/0019138 A1 | 1/2016 | Lee | |
| 2016/0092307 A1 * | 3/2016 | Bonen .................. | G06F 11/1004 |
| | | | 714/764 |
| 2018/0225173 A1 * | 8/2018 | Baek .................... | G06F 11/1048 |
| 2018/0336139 A1 * | 11/2018 | Rao ....................... | G11C 16/105 |
| 2019/0065397 A1 * | 2/2019 | Troia .................. | G06F 12/1018 |

OTHER PUBLICATIONS

Amato, et al. "Fast Decoding ECC for Future Memories", IEEE Journal on Selected Areas in Communications, vol. 34, No. 9, Sep. 2016, 12 pp.
International Search Report and Written Opinion from related International Application No. PCT/US2019/025169, dated Aug. 6, 2019, 11 pages.

* cited by examiner

*Primary Examiner* — Samir W Rizk
(74) *Attorney, Agent, or Firm* — Brooks, Cameron & Huebsch, PLLC

(57) ABSTRACT

Apparatuses and methods related to providing transaction metadata. Providing transaction metadata includes providing an address of data stored in the memory device using an address bus coupled to the memory device and the controller. Providing transaction metadata also includes transferring the data, associated with the address, from the memory device using a data bus coupled to the memory device and the controller. Providing transaction metadata further includes transferring a sideband signal synchronously with the data bus and in conjunction with the address bus using a transaction metadata bus coupled to the memory device and the controller.

24 Claims, 4 Drawing Sheets

| BEAT | 0-7 | 8-15 | 16-23 | 24-31 | 32-39 | 40-47 | 48-55 | 56-63 |
|---|---|---|---|---|---|---|---|---|
| TRAN | STAT | IOP | EXTI | EXTI | EXTI | EXTI | EXTI | EXTI |
| | ⌐222 | ⌐224 | ⌐226 | ⌐226 | ⌐226 | ⌐226 | ⌐226 | ⌐226 |

220⎯

224⎯

| FIELD | SYMBOL | SEVERITY | DESCRIPTION | EXAMPLE |
|---|---|---|---|---|
| INTERNAL OPERATION | IOP | REGULAR | NO INFORMATION | - NO ERROR DETECTED, NO ERROR CORRECTED |
| | | WATCH | MANAGEMENT OPERATION IS OPTIONAL | - ERROR DETECTED AND CORRECTED<br>• ECC HAS APPLIED ON 64B DATA<br>- ERROR DETECTED BUT NOT CORRECTED<br>• CONTROLLER PERFORMS A CONCATENATED ECC CORRECTION (INTERNAL AND EXTERNAL)<br>- CONTROLLER CAN TAKE OTHER ACTIONS<br>- DEVICE CAN BE AUTHORIZED BY THE CONTROLLER TO APPLY THE CORRECTION TO THE ARRAY CONTENT THROUGH A SPECIAL COMMAND |
| | | WARNING | MANAGEMENT OPERATION IS NEEDED | - WEAR-LEVELING, REFRESH, CLEANING |
| | | ERROR | HIGHEST SEVERITY EVENT OCCURRED | |

| FIELD | SYMBOL | EXAMPLE |
|---|---|---|
| EXTENDED INFORMATION | EXTI | - PARITY BITS<br>- SYNDROME<br>- CALIBRATION BITS |

226⎯

| FIELD | SYMBOL | EXAMPLE |
|---|---|---|
| STATUS | STAT | - TEMPERATURE ALERT<br>- TEMPERATURE<br>- READOUT |

222⎯

| BEAT | 0 - 7 | 8 - 15 | 16 - 23 | 24 - 31 | 32 - 39 | 40 - 47 | 48 - 55 | 56 - 63 |
|---|---|---|---|---|---|---|---|---|
| TRAN | STAT | IOP | EXTI | EXTI | EXTI | EXTI | EXTI | EXTI |
|  | 222 | 224 | 226 | 226 | 226 | 226 | 226 | 226 |

220 ⟶

224 ⟶

| FIELD | SYMBOL | SEVERITY | DESCRIPTION | EXAMPLE |
|---|---|---|---|---|
| INTERNAL OPERATION | IOP | REGULAR | NO INFORMATION | - NO ERROR DETECTED, NO ERROR CORRECTED |
|  |  | WATCH | MANAGEMENT OPERATION IS OPTIONAL | - ERROR DETECTED AND CORRECTED<br>• ECC HAS APPLIED ON 64B DATA<br>- ERROR DETECTED BUT NOT CORRECTED<br>• CONTROLLER PERFORMS A CONCATENATED ECC CORRECTION (INTERNAL AND EXTERNAL)<br>- CONTROLLER CAN TAKE OTHER ACTIONS<br>- DEVICE CAN BE AUTHORIZED BY THE CONTROLLER TO APPLY THE CORRECTION TO THE ARRAY CONTENT THROUGH A SPECIAL COMMAND |
|  |  | WARNING | MANAGEMENT OPERATION IS NEEDED | - WEAR-LEVELING, REFRESH, CLEANING |
|  |  | ERROR | HIGHEST SEVERITY EVENT OCCURRED |  |

| FIELD | SYMBOL | EXAMPLE |
|---|---|---|
| STATUS | STAT | - TEMPERATURE ALERT<br>- TEMPERATURE READOUT |

222 ⟶

| FIELD | SYMBOL | EXAMPLE |
|---|---|---|
| EXTENDED INFORMATION | EXTI | - PARITY BITS<br>- SYNDROME<br>- CALIBRATION BITS |

| BIT | 7 | 6 | 5 | 4 | 3 | 2 | 1 | 0 |
|---|---|---|---|---|---|---|---|---|
| IOP FIELD | SEVERITY 333 | SEVERITY 333 | RESERVED 332 | RESERVED 332 | RESERVED 332 | TYPE 331 | TYPE 331 | EXTENSION 330 |

| IOP FIELD | BITS | VALUE | INFORMATION | DESCRIPTION | ACTION |
|---|---|---|---|---|---|
| IOP[7:6] | SEVERITY 333 | 00 [DEFAULT] | REGULAR | NO INFORMATION | NO ACTION REQUIRED |
| | | 01 | WATCH | MANAGEMENT OPERATION IS OPTIONAL | READ TYPE BITS FOR DETAILS |
| | | 10 | WARNING | MANAGEMENT OPERATION IS NEEDED | CONTROLLER DECISION |
| | | 11 | ERROR | HIGHEST SEVERITY EVENT OCCURRED | CONTROLLER DECISION |
| IOP[5:3] | RESERVED 332 | | | | |
| IOP[2:1] | TYPE 331 | 00 [DEFAULT] | READ SUCCESSFUL | NO ERROR DETECTED, NO CORRECTION APPLIED | NO ACTION REQUIRED |
| | | 01 | | | |
| | | 10 | READ ERROR | ERROR DETECTED, NO CORRECTION APPLIED | READ EXTI BITS |
| | | 11 | READ CORRECTED | ERROR DETECTED, CORRECTION APPLIED | CONTROLLER DECISION |
| IOP[0] | EXTENSION 330 | 0 [DEFAULT] | EO METADATA FRAME | EXTI BITS ARE NOT USED | NO ACTION REQUIRED |
| | | 1 | ADDITIONAL METADATA | EXTI BITS CONTAIN VALID INFORMATION | READ EXTI BITS |

*Fig. 3*

| BIT | 7 | 6 | 5 | 4 | 3 | 2 | 1 | 0 |
|---|---|---|---|---|---|---|---|---|
| IOP FIELD | SEVERITY | SEVERITY | RESERVED | RESERVED | RESERVED | TYPE | TYPE | EXTENSION |
| EXAMPLES | | | | | | | | |
| OK | 0 | 0 | | | | 0 | 0 | 0 |
| - WATCH<br>- ERROR DETECTED BUT NOT CORRECTED INTERNALLY BY THE DEVICE<br>- ADDITIONAL INFORMATION AVAILABLE | 0 | 1 | | | | 1 | 0 | 1 |
| - WATCH<br>- ERROR DETECTED AND CORRECTED INTERNALLY BY THE DEVICE<br>- ADDITIONAL INFORMATION AVAILABLE | 0 | 1 | | | | 1 | 1 | 1 |

TRANSACTION METADATA

TECHNICAL FIELD

The present disclosure relates generally to memory, and more particularly, to apparatuses and methods associated with metadata associated with data retrieved from memory.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications. Non-volatile memory may be used in, for example, personal computers, portable memory sticks, digital cameras, cellular telephones, portable music players such as MP3 players, movie players, and other electronic devices. Memory cells can be arranged into arrays, with the arrays being used in memory devices.

Various computing systems include processing resources that are coupled to memory (e.g., a memory system), which is accessed in association with executing a set of instruction (e.g., a program, applications, etc.). A memory system can use error correction codes (ECC) to detect and correct errors in data.

BRIEF DESCRIPTION OF THE DRAWINGS

FIG. 2 is a block diagram of a transaction metadata frame format in accordance with a number of embodiments of the present disclosure.

FIG. 3 is a block diagram of an TOP field format according to a number of embodiments of the present disclosure.

FIG. 4 is a block diagram of transaction metadata frames in accordance with a number of embodiments of the present disclosure.

DETAILED DESCRIPTION

Figure 1:
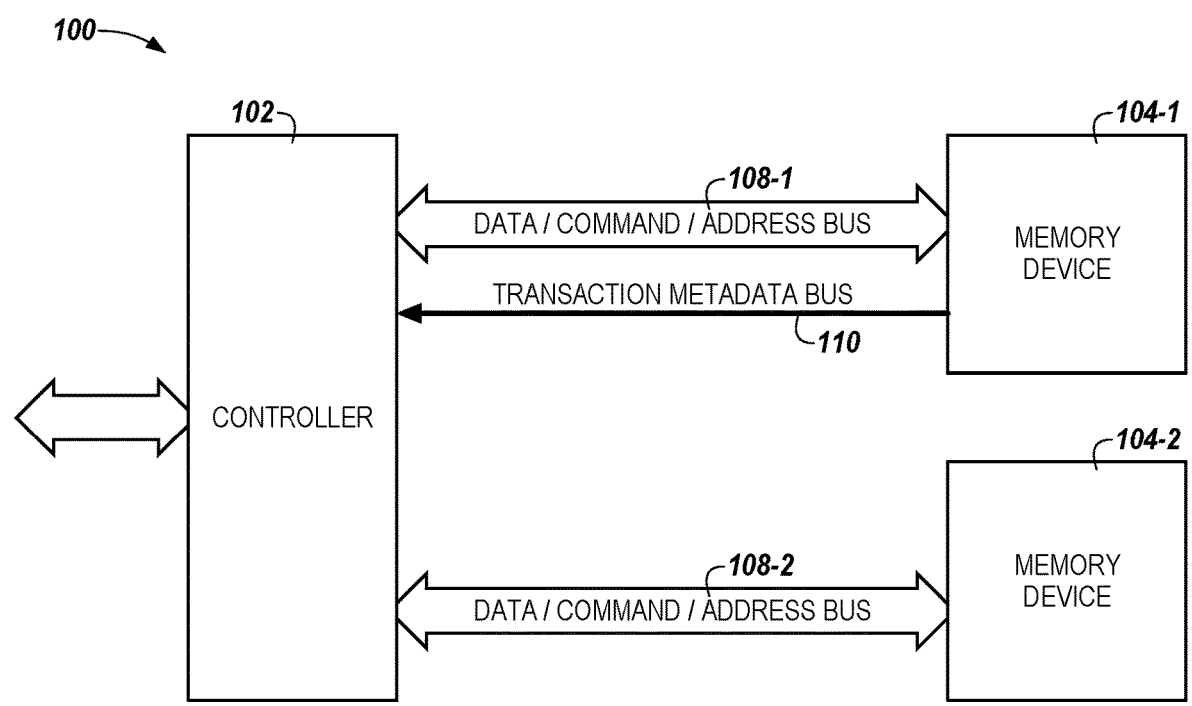
FIG. 1 is a block diagram of a memory system including a memory device and a controller capable of implementing a number of embodiments of the present disclosure.

The present disclosure includes apparatuses and methods related to transaction metadata associated with data retrieved from memory. An example method can include providing an address of data stored in a memory device via an address bus, transferring the data, associated with the address, from the memory device via a data bus, and transferring a sideband signal synchronously with the data bus and in conjunction with the address bus.

A number of embodiments of the present disclosure can provide transaction metadata associated with data transferred to a controller. The transaction metadata can also be referred to as transaction information metadata. In some examples, the transaction metadata can provide metadata associated with an error correction code (ECC) for performing error corrections on the data stored using a memory device. For instance, some prior ECCs include adding redundant data or parity data to a message such that the message can be recovered. The transaction metadata can be used to provide the parity data, among other types of ECC data, to the controller. Errors can be introduced into the data during transmission, storage, and/or retrieval of the data.

Storage has been a performance bottleneck in computer systems. The ability to store data and retrieve data from storage has been a limiting factor in the ability of a computer system to perform computations and operations.

Although NAND-based storage solutions have improved over hard drive latencies by more than 10×, storage has remained a latency laggard. Emerging memory (EM) technologies such as phase-change memory (PCM), magnetoresistive random access memory (MRAM), resistive random-access memory (ReRAM), and/or 3D XPoint memory may improve memory related latencies over other memory technologies. The EM can provide data storage that is as fast as the rest of the system (e.g., computing system). The EM can provide data storage that has a latency that is comparable to the latency of the other components of a computing system. To cope with reliability targets of storage applications, EM may utilize ECCs that are able to correct errors and retain the low-latency performance of a device hosting the EM. Given that storage applications, unlike memory applications, can tolerate variable access latencies, it may be beneficial to utilize an ECC decoder with a low latency. In some examples, low latency can comprise a latency within the range of a plurality of nanoseconds. In other examples, a higher latency can be a latency within the range of a plurality of microseconds.

ECC decoders with a high correction capability and a low latency can be achieved by utilizing ECC concatenation schemes and hierarchical decoders. As used herein, hierarchical decoders can describe the use of multiple decoders to correct errors in data. Hierarchical decoders can include the use of fast decoding (FD) decoders and accurate decoding (AD) decoders. In some examples, a hierarchical decoding scheme can utilize FD decoders and can resort to more powerful ECCs used in AD decoders when needed.

In a number of embodiments, a hierarchical code architecture utilizes an FD decoder embedded in a memory device and an AD decoder implemented in a storage controller. To have an effective and efficient solution, the FD decoder architecture can be adapted for use in a hierarchical scheme.

The FD decoder can trigger the AD decoder utilizing a validity flag and/or or a plurality of other types of data including parity bits. The validity flags, the parity bits, and/or other types of data associated with ECC can be provided from the memory device to the controller utilizing transaction metadata. Although the examples provided herein are used to provide data associated with ECC, the examples are not limited to error correction data but can be used to provide other types of data associated with the memory device. For examples, the transaction metadata can be used to provide temperatures associated with the memory device. The error correction data can include data used to perform error correction operations as described herein.

In the following detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designator "N" indicates that a number of the particular feature so designated can be included with a number of embodiments of the present disclosure.

As used herein, "a number of" something can refer to one or more of such things. For example, a number of memory devices can refer to one or more of memory devices. A "plurality" of something intends two or more. Additionally, designators such as "N," as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

FIG. 1 is a block diagram of a memory system 100 including a memory device 104-1 and a controller 102 capable of implementing a number of embodiments of the present disclosure. The memory system 100 includes the controller 102 and memory devices 104-1 and 104-2, referred to generally as memory devices 104. The memory system 100 also includes data buses 108-1 and 108-2, referred to generally as data buses 108, and a transaction metadata bus 110.

As used herein, an "apparatus" can refer to, but is not limited to, a variety of structures or combinations of structures, such as a circuit or circuitry, a die or dice, a module or modules, a device or devices, or a system or systems. For example, the memory system 100, the controller 102, the memory devices 104, and the data buses 108 may separately or collectively be referred to as an "apparatus."

In this example, a computing system includes a host coupled to the controller 102 which is coupled to the memory system 100. The computing system can be a laptop computer, personal computers, digital camera, digital recording and playback device, mobile telephone, PDA, memory card reader, interface hub, sensor, Internet-of-Things (IoT) enabled device (e.g., thermostats, bulbs, locks, security systems, toothbrushes, pet feeders, etc.), among other systems, and the host can include a number of processing resources (e.g., one or more processors) capable of accessing the memory system 100 (e.g., via the controller 102). The host may be responsible for execution of an operating system (OS) and/or various applications that can be loaded thereto (e.g., from the memory system 100 via the controller 102).

The controller 102 may receive memory transaction requests (e.g., in the form of read and/or write commands, which may be referred to as load and store commands, respectively) from the host. The controller 102 can transfer commands and/or data between the host and the memory system 100 over a number of interfaces, which can comprise physical interfaces such as buses, for example, employing a suitable protocol. Such protocol may be custom or proprietary, or interfaces may employ a standardized protocol, such as Peripheral Component Interconnect Express (PCIe), Gen-Z, CCIX, or the like. The controller 102 can comprise control circuitry, in the form of hardware, firmware, or software, or any combination of the three. As an example, the controller 102 can comprise a state machine, a sequencer, and/or some other type of control circuitry, which may be implemented in the form of an application specific integrated circuit (ASIC) coupled to a printed circuit board. In a number of embodiments, the controller 102 may be co-located with the host (e.g., in a system-on-chip (SOC) configuration). Also, the controller 102 may be co-located with the memory system 100.

The memory system 100 can comprise a number of physical memory "chips," or dice which can each include a number of arrays (e.g., banks) of memory cells and corresponding support circuitry (e.g., address circuitry, I/O circuitry, control circuitry, read/write circuitry, etc.) associated with accessing the array(s) (e.g., to read data from the arrays and write data to the arrays). As an example, the memory system 100 can include a number of DRAM devices, SRAM devices, PCRAM devices, RRAM devices, FeRAM, phase-change memory, 3DXpoint, and/or Flash memory devices. In a number of embodiments, the memory system 100 can serve as main memory for the computing system. In FIG. 1 the memory device 104-1 can be a mobile 3DX point device while the memory device 104-2 is a NAND memory device. Although, the examples shown herein are not limited to mobile 3DX point devices and/or NAND memory devices. The embodiments described herein can be applied to different memory devices including EM.

The memory system 100 may comprise one or more memory devices which may be coupled to the controller 102 via one or more transaction metadata buses. For examples, the memory device 104-1 is coupled to the controller 102 through a data bus 108-1 and the metadata bus 110. The memory device 104-2 is coupled to the controller 102 through the data bus 108-2.

Although not shown, the data buses 108 can represent a number of buses and/or lines. For example, the data buses 108 can represent a data bus, an address bus, and/or a command bus. The memory devices 104 can be coupled to the controller 102 via one or more buses including the data bus 108, the command bus, and/or the address bus.

The data buses 108 can be configured to transfer data from the memory devices 104 to the controller 102 and/or to transfer data from the controller 102 to the memory devices 104. The command buses can be configured to provide commands from the controller 102 to the memory devices 104. The commands can include, for examples, read commands and/or write commands, among other possible commands that can be provided to the memory devices 104. The address buses can include address information associated with the commands. For examples, an address associated with a read command can be provided via an address bus connection the memory device 104-1 and the controller 102.

The transaction metadata bus 110 can couple the memory device 104-1 to the controller 102. The transaction metadata bus 110 can transfer transaction metadata associated with data transferred through the data bus 108-1. In some examples, the transaction metadata bus 110 can transfer the transaction metadata using a 32-clock cycle and the data bus 108-1 can also transfer data using the 32-clock cycle. The transaction metadata bus 110 can also transfer the transaction metadata using a different clock cycle. The transaction metadata bus 110 can be an additional DQ bus coupling the memory device 104-1 and the controller 102. The transaction metadata bus 110 can provide a sideband signal.

In some examples, the controller 102 can provide a command to the memory devices 104 utilizing command buses. For example, the controller 102 can provide a read command to the memory device 104-1. The memory device 104-1 can provide data responsive to receiving and/or processing the read command. The memory device 104-1 can also provide the transaction metadata concurrently with the data using the transaction metadata bus 110. The transaction metadata data can be provided to the controller 102 at a same time that the data is provided to the controller 102.

The transaction metadata can be associated with the data. The size of the transaction metadata can be a same size as the data. The size of a frame of transaction metadata can be a same size as a frame of the data. The size of the transaction metadata and/or the data can be predetermined. For example, the size of the transaction metadata and the data can be 64 bytes, but is not limited to 64 bytes. Said differently, a length of the transaction metadata can be equal to the access length granularity of the data. In some examples, the transaction metadata and the data can be provided in pages. A size of the pages used to transmit the transaction metadata can be a same size as a size of the pages used to transmit the data.

In some examples, the controller 102 can receive 64 bytes but may not process entire 64 bytes. The controller 102 can be configured to read a predetermined number of the 64 bytes. The predetermined bits can be configured to point to other of the 64 bytes such that the controller 102 can access bits as they become needed to process the predetermined bits. The controller 102 can process a chain of extended information which comprises a number of the 64 bytes. The controller 102 can access a first number of bits of the 64 bytes. Responsive to processing the first number of bits, the controller 102 can access a second number of bits of the 64 bytes to form a chain of the first number of bits and the second number of bits. The chain can include a plurality of links comprising different numbers of bits which reference other numbers of links.

Both the transaction metadata and the data can be provided to the controller 102 responsive to receiving a command from the controller 102. A latency (e.g., deterministic read latency) between receiving a command from the controller 102 and providing the data and/or the transaction metadata can be the same for both the data and the transaction metadata. As such, a first bit of the transaction metadata and a first bit of the data and a last bit of the transaction metadata and the data can be provided to the controller 102 at a same time.

In other examples, the transaction metadata and the data can be provided to the controller 102 without being sent at a same time. In such examples, a first bit of the transaction metadata does not have to be sent at a same time as a first bit of the transaction metadata. The transaction metadata, that is associated with a first read command used to generate a first data set, can be provided before the memory device 104-1 fulfills a second read command.

In some examples, the transaction metadata can be provided to the controller 102 independently of transmissions by the data bus 108-1. The transaction metadata can be provided independently of data bus transmissions if the transaction metadata provides information about the memory device 104-1 and not about data transferred using the data bus 108-1.

The transaction metadata can be associated with data transferred using the data bus 108-1. The transaction metadata can include information describing operations performed on data transferred using the data bus 108-1, requests associated with the data, and/or information describing the data.

FIG. 2 is a block diagram of a transaction metadata frame format in accordance with a number of embodiments of the present disclosure. FIG. 2 includes a transaction metadata frame 220. The transaction metadata frame 220 can be used to provide transaction metadata as described in FIG. 1.

The transaction metadata frame 220 includes status bits (e.g., STAT) 222, internal operation bits (e.g., IOP) 224, and extended information bits (e.g., EXTI) 226. The status bits 222, the internal operation bits 224, and the extended information bits 226 can be referred to as a status field, an internal operation field, and an extended information field, respectively.

The transaction metadata frame 220 includes 64 bytes starting at bit "0" and extending to bit "63." The transaction metadata frame 220 can include other sizes. The transaction metadata frame 220 can comprise 8, 16, 32, 128, or more bits.

The placement of the status bits 222, the internal operation bits 224, and/or the extended information bits 226 can differ from example to example. The embodiment of FIG. 2 includes the status bits 222 having bit-indexes zero to seven. The internal operation bits 224 range from bit-indexes eight to fifteen. The external information bits 226 range from bit-indexes sixteen to sixty-three. Each of the status bits 222, the internal operation bits 224, and/or the extended information bits 226 can comprise more bits or less bits than those described herein.

The status bits 222 can be represented by the symbol "STAT." The status bits 222 can describe a status of the memory device providing the transaction metadata. The status bits 222 can provide data stored in status registers of the memory device. The status bits 222 can provide a temperature alert, a temperature, and/or a readout of the memory device.

In some examples, the stats bits 222 can be used to determine whether management of the memory device is more pressing than management of the data stored in the memory device. If the temperature of the memory device is above a threshold, then the controller may manage the memory device to lower the temperature. If the status bits 222 provide information which is processed by the controller to describe a memory device that is functioning within predetermined variances, then the controller can continue to manage the data and/or error corrections performed on the data as described by the internal operations bits 224.

The internal operation bits 224 can be represented by the symbol "TOP." The internal operations bits 224 can include four different values which are described as severities in FIG. 2. The internal operation bits 224 can be set to a regular severity, a watch severity, a warning severity, or an error severity using a plurality of bit values.

A regular severity can provide no description of the data concurrently provided with the transaction metadata. The regular severity can describe that the memory device providing the transaction metadata detected no errors and performed no corrections on the data. The memory device can utilize a FD decoder hosted by the memory device to determine that the data does not contain errors. The regular severity can also describe that the FD decoder did not perform any correction operations on the data.

A watch severity can describe that management operations are optional. Management operations can include any operational that can be performed to manage the data and/or the memory device providing the data and/or the transaction metadata.

For example, a watch severity can describe that the memory device detected and corrected errors using an ECC applied on the 64 bytes of the data. The watch severity can also describe that the memory device detected one or more errors but did not correct one or more of the detected errors. For example, the watch severity can describe that the memory device detected two errors but only corrected one of the errors. The controller receiving the transaction metadata can correct the errors identified and not corrected by the memory device using concatenation ECC using an internal and an external decoder. For example, the controller can utilize an AD decoder and/or and FD decoder hosted by the controller to identify the errors and/or correct errors in the data received via the data bus. In some examples, the AD decoder hosted by the controller can be an internal (inner) AD decoder and the FD decoder hosted by the controller can be an external (outer) decoder.

The watch severity can also describe that the controller can perform actions other than the concatenated ECC. That is, the watch severity can describe that the controller can perform operation other than ECC corrections. For example, the controller can decide not to correct the errors identified in the data, but instead provide a re-read command to the memory device utilizing the command bus.

The watch severity can also request authorization to apply corrections to array content utilizing a special command. For example, the memory device can provide intentional operation bits describing a watch severity which request permission to apply corrections to data stored in an array of the memory device. The special command can be the actual watch severity or can be a command embodied in the extended information bits 226.

A warning severity can describe that management operations are compulsory and/or needed. The controller, responsive to receiving the warning severity can perform wear-leveling operations, refresh operations, and/or cleaning operations, among other types of management operations that can be performed by the controller to improve the ability to retrieve the data. Different management operations associated with the warning severity can include operations at the array level instead of operations at the decoder level. The management operations associated with the warning severity can improve the ability of the memory device to successfully retrieve the data.

The error severity can be a highest severity event occurrence in a memory device. The error severity can describe a catastrophic event. For example, the error severity can describe that an array is not available, that the device capacity is not reachable, that the data is not recoverable, and/or that part of the data is not recoverable, among other catastrophic events.

The extended information bits 226 can be represented by the symbol "EXTI." The extended information bits 226 can describe operations performed on the data and by the memory device. The extended information bits 226 can provide information used by the memory device and/or the controller to perform operations, including error correction operations, on the data. The extended information bits 226 can describe requests and/or commands provided by the memory device. For example, the extended information bits 226 can include parity bits, syndromes, calibration bits, and/or validity flags that can activate one or more decoders hosted by the controllers and can provide information used by the activated decoders to perform ECC on the data.

FIG. 3 is a block diagram of an TOP field 324 according to a number of embodiments of the present disclosure. The internal operation field 324 can include an extension bit 330, type bits 331, reserved bits 332, and severity bits 333. The internal operation field 324 can include more or less types of bits than those described herein.

The examples shown of the internal operation field 324 includes eight bits. The extension bit 330 is provided as having bit-index 0. The type bits 331 are provided as having bit-indexes 1 to 2. The reserved bits 332 are provided as having bit-indexes 3 to 5. The severity bits 333 are provided as having bit-indexes 6 to 7.

The severity bits 333 can include a regular severity, a watch severity, a warning severity, and an error severity. The regular severity can be expressed as bits "00," the watch severity can be expressed as bits "01," the warning severity can be expressed as bits "10," and the error severity can be expressed as bits "11." The bits used to represent the different severity values can be different than those described herein. For example, more or less bits can be used to represent the different severities. Also, different bit values can be used to represent the different severity values. The regular severity can be a default severity.

As previously noted, the regular severity can convey no information given that no action is needed. The watch severity can describe that management operation is optional. The controller can read type fields for details on possible actions to take given the watch severity. The warning severity can describe that management operations are needed. The controller can perform actions in conjunction with the information provided by the transaction metadata and/or independently of the information provided by the transaction metadata. The error severity can describe that a highest severity event occurred. Once again, the controller can perform action in conjunction with the information provided by the transaction metadata and/or independently of the information provided by the transaction metadata.

The reserved bits 332 can be reserved for additional functionality and/or information used in conjunction with a severity of an even associated with the data. The type bits 331 can include a read successful type, a read error type, and a read correction type, among other types that can be used. The type bit values and the extensions bit values used herein are exemplary and should not be interpreted as limiting. More or less values than those shown herein can be incorporated into the embodiments described herein.

The read successful type can be expressed as bits "00," the read error type can be expressed as bits "10," and the read corrected type can be expressed as bits "11." The bits "01" of the type bits 331 and/or the reserved bits 332 can remained undefined or may be defined by the controller and/or by the memory device to provided additional functionality and/or expanded capabilities to the transaction metadata. The read successful type represented by bits "00" can be a default value of the type bits 331.

The read successful type can describe that no error was detected and no correction was applied by the memory device to the data. Accordingly, no action may be required given the read successful type. The read error type can describe that an error was detected but that no correction was applied by the memory device to the data. The controller may read extended information bits (e.g., extended information bits 226 in FIG. 2) responsive to processing a read error type. The memory device may provide commands, information, and/or flags using the extended information bits to allow the controller to perform operations on the data utilizing the extended information bits and/or information provided in the extended information bits. The read corrected bits can describe that an error was detected in the data and that the error was corrected by the memory device. The controller may perform operations without being directed to the extended information bits responsive to processing the read corrected bits. For example, the controller may process extended information bits without being directed to the extended information bits to further process the data. The controller may also process the data without referring to the extended information bits.

The extension bits 330 can be expressed by a bit "0" or a bit "1" to embody an end of (EO) metadata frame extension and an additional metadata extension, respectively. The EO metadata frame extension can describe that extended information bits are not used and as such not action should be taken by the controller. The additional metadata extension can describe that extended information bits contain valid information and as a result the extended information bits should be read. The memory device can activate the extended information bits utilizing the extension bits 330.

In some examples, a controller can request data via an address bus. The data can be received via a data bus coupled to the memory device. The transaction metadata can be received, via a transaction metadata bus coupled to the memory device, concurrently with a receipt of the data. The controller can process the status bits, from the transaction metadata, describing a status of the memory device. The controller can also process internal operation bits, from the transaction metadata, describing operations performed on the data using an error correction code hosted by the memory device. The controller can further process the extended information bits, from the transaction metadata, comprising error correction data. The controller can determine whether to perform a number of error correction operations based on the status bits, the internal operation bits, and/or the extended information bits.

The controller can refrain from performing the number of error correction operations and instead can perform memory device operations based on determining that the status of the memory device does not meet a predefined criterion. In some examples, the controller can determine that the status of the memory device meets a predefined criterion.

The controller can, responsive to determining that the status of the memory device meets a predefined criterion, assess a state of the data using severity bits from the internal operation bits. The controller can perform no actions based on determining that the state of the data is a regular state. The controller can read type bits from the internal operation bits based on determining that the state of the data is a watch state.

The controller can also refrain from performing the number of error correction operations based on determining that the type bits describe a successful read operation of the data. The controller can also perform the number of error correction operations using the extended information bits based on determining that the type bits describe an error detected. The controller can further perform the number of error correction operations as requested by extension bits, from the internal operation bits, and as further expounded by the extended information bits.

FIG. 4 is a block diagram of transaction metadata frames 440 in accordance with a number of embodiments of the present disclosure. FIG. 4 shows the TOP field of the transaction metadata frames 440. Three examples of transaction metadata frames 440 are provided as transaction metadata frames 440-1, 440-2, and 440-3.

The transaction metadata frame 440-1 can comprise an extension bit having a "0" bit, type bits having "00" bits, and severity bits having "00" bits. The extension bit can indicate that the extension information bits should not be activated. That is, the extension bit can indicate that the extension information bits should be ignored. The severity bits can describe a regular severity. The controller may refrain from performing operations responsive to receiving the transaction metadata. The type bits may not be processed given that they are not reference by the severity bits. The controller may also refrain from processing the extended information bits because the severity bits and the type bits do not reference the extended information bits.

The transaction metadata frame 440-2 can comprise an extension bit having a "1" bit, type bits having "10" bits, and severity bits having "01" bits. The extension bit can describe an additional metadata extension to activate extended information bits. The type bits can describe a read error type to describe that the memory device detected an error but did not correct the error. The severity bit can describe a watch severity and can resort to the type bits for further information used to process the data. That is, the severity bits can provide that additional information is available through the type bits and the extension bits.

The transaction metadata frame 440-3 can comprise an extension bit having a "1" bit, type bits having "11" bits, and severity bits having "01" bits. The extension bit can describe an additional metadata extension to activate extended information bits. The type bits can describe a read correction type to describe that the memory device detected and corrected an error in the error. The severity bit can describe a watch severity and can resort to the type bits for further information used to process the data. That is, the severity bits can provide that additional information is available through the type bits and the extension bits.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combinations of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A memory system, comprising:
 a memory device comprising error correction code;
 a controller;
 an address bus coupled to the memory device and the controller configured to provide an address of data stored in the memory device;
 a data bus coupled to the memory device and the controller and configured to transfer the data, associated with the address, from the memory device;
 a transaction metadata bus coupled to the memory device and the controller and configured to transfer a sideband signal synchronously with the data bus and in conjunction with the address bus,
  wherein the transaction metadata bus is separate from the address bus and the data bus,
  wherein a frame of the transaction metadata bus and a frame of the address bus have a same size, and
  wherein transaction metadata bus is further configured to transfer transaction metadata describing operations performed on the data using the error correction code, and
 wherein the controller is configured to determine whether to perform a number of error correction operations based on the transaction metadata received from the memory device.

2. The memory system of claim 1, wherein the transaction metadata is associated with the data transferred using the data bus.

3. The memory system of claim 1, wherein the transaction metadata describes error correction operations performed by the memory device on the data.

4. The memory system of claim 1, wherein the data bus and the transaction metadata bus operate on a 32-clock cycle.

5. A memory device comprising a memory array and configured to:
 receive, from a controller, a request for data via an address bus;
 retrieve the data from the memory array responsive to receiving the request;
 generate transaction metadata for the data responsive to retrieving the data;
 provide, to the controller, the data via a data bus; and
 provide, to the controller, the transaction metadata concurrently with the data via a transaction metadata bus,
  wherein the transaction metadata bus is separate from the address bus and the data bus,
  wherein a frame of the transaction metadata bus and a frame of the address bus have a same size,
  wherein the transfer transaction metadata describes operations performed on the data using an error correction code of the memory device, and
  wherein the transaction metadata is provided to the controller to enable the controller to determine whether to perform a number of error correction operations based on the transaction metadata received from the memory device.

6. The memory device of claim 5, wherein the memory array is further configured to perform an error correction on the data responsive to retrieving the data.

7. The memory device of claim 6, wherein the transaction metadata is associated with the error correction performed on the data.

8. The memory device of claim 7, further configured to generate the transaction metadata including internal operation bits describing the error correction performed on the data.

9. The memory device of claim 8, wherein the internal operation bits include severity bits describing the error correction performed on the data.

10. The memory device of claim 7, further configured to generate the transaction metadata including status bits describing the status of the memory device.

11. The memory device of claim 7, further configured to generate the transaction metadata including extended information bits including error correction data associated with the error correction code.

12. The memory device of claim 11, wherein the extended information bits include parity bits.

13. The memory device of claim 11, wherein the extended information bits include syndrome bits.

14. The memory device of claim 11, wherein the extended information bits include calibration bits.

15. The memory device of claim 11, further configured to generate the transaction metadata having a same size as a size of the data.

16. A method comprising:
 requesting data via an address bus;
 receiving the data via a data bus coupled to a memory device;
 receiving transaction metadata via a transaction metadata bus coupled to the memory device concurrently with a receipt of the data,
  wherein the transaction metadata bus is separate from the address bus and the data bus,
  wherein a frame of the transaction metadata bus and a frame of the address bus have a same size, and
  wherein the transaction metadata is provided to the controller to enable the controller to determine whether to perform a number of error correction operations based on the transaction metadata;
 processing status bits from the transaction metadata describing a status of the memory device;
 processing internal operation bits from the transaction metadata describing operations performed on the data using an error correction code hosted by the memory device;
 processing extended information bits from the transaction metadata comprising error correction data; and
 determining whether to perform the number of error correction operations based on the status bits, the internal operation bits, and the extended information bits.

17. The method of claim 16, further comprising:
 refraining from performing the number of error correction operations; and
 performing memory device operations based on determining that the status of the memory device does not meet a predefined criterion.

18. The method of claim 16, further comprising determining that the status of the memory device meets a predefined criterion.

19. The method of claim 18, further comprising determining a state of the data using severity bits from the internal operation bits.

20. The method of claim 19, further comprising performing no action based on determining that the state of the data is a regular state.

21. The method of claim 19, further comprising reading type bits from the internal operation bits based on determining that the state of the data is a watch state.

22. The method of claim 21, further comprising refraining from performing the number of error correction operations based on determining that the type bits describe a successful read operation of the data.

23. The method of claim 21, further comprising performing the number of error correction operations using the extended information bits based on determining that the type bits describe an error detected.

24. The method of claim 19, further comprising performing the number of error correction operations as requested by extension bits, from the internal operation bits, and as further expounded by the extended information bits.

* * * * *